May 17, 1932.  R. H. THATCHER  1,858,315
LUBRICATED BEARING
Filed Aug. 16, 1930
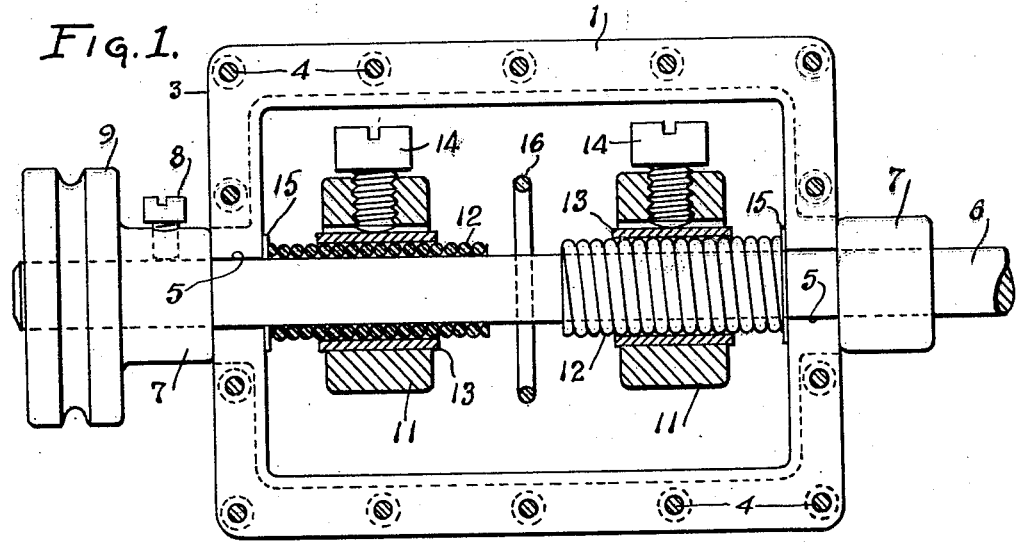
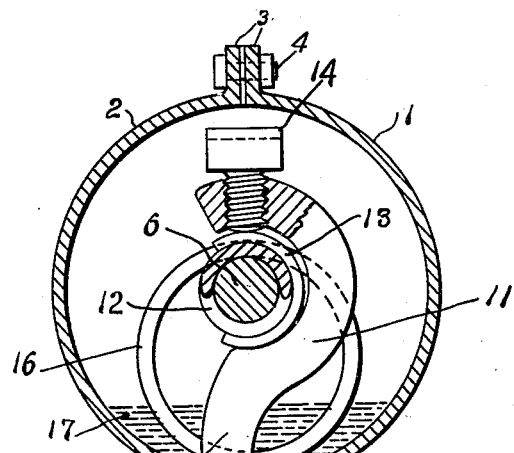
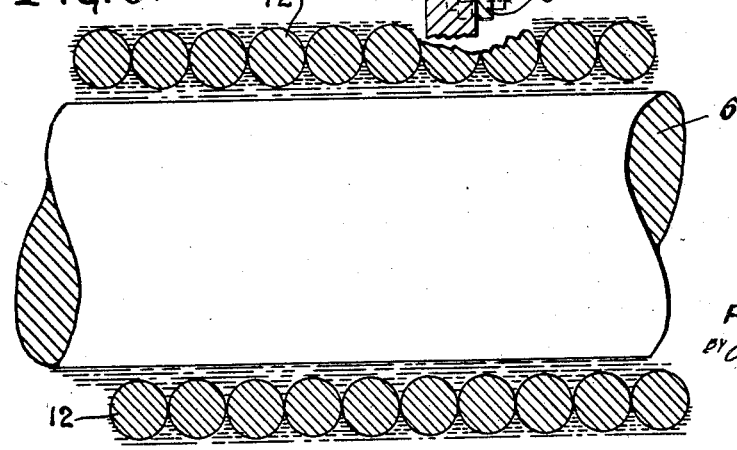
Inventor
RALPH H. THATCHER Patented May 17, 1932

1,858,315

UNITED STATES PATENT OFFICE

RALPH H. THATCHER, OF SPRINGFIELD, OHIO

LUBRICATED BEARING

Application filed August 16, 1930. Serial No. 475,790.

This invention relates to improvements in bearings, and has for its object to provide a bearing that is self-lubricating.

It is particularly the object of this invention to provide a bearing composed of a spring of some hard material, such as steel, supported by an arm and held to the arm by means of a soft metal plate partly extending around the spring.

It is particularly the object of this invention to provide in connection with a bearing of this kind, means for providing a lubricant and conveying the lubricant to a shaft adjacent the bearing so that the lubricant may be conducted along the shaft through the bearing.

It is more particularly the object of this invention to provide a bearing that by means of capillary attraction conveys the lubricant along the shaft and between the shaft and the bearing. It is particularly understood that the bearing does not contact with the shaft but has between the shaft and it a space occupied by the lubricant. Not only is there a thin extent of space between the two, but there is also provided a series of capillary passageways, along which the lubricant passes for lubricating purposes.

These and other objects of the invention will appear from the following description taken in connection with the drawings.

Referring to the drawings:

Figure 1 is a top plan view of the bearing with part of the housing removed.

Figure 2 is a vertical section through the housing and the parts contained therein.

Figure 3 is an enlarged view of a section of the shaft and section of the bearing spring, with the space between the two exaggerated to show the position of the lubricant in regard to the shaft and the bearing spring.

The casing or housing constituting the support for the bearing or bearings is composed of two sections, a section 1 and a section 2, united by means of outwardly projecting flanges 3 which have holes therethrough for bolts 4 to hold the two sections together to form a unitary housing or casing.

At each end of the housing there is an opening 5 for a shaft. The housing as shown in Figures 1 and 2 is cylindrical in shape and has in each end an opening 5 through which the shaft 6 passes. On the shaft and without each end of the housing is a cuff 7, which holds the shaft against longitudinal movement in the housing. The holes or openings 5 do not constitute the bearings or supports for the shaft but merely provide an opening for receiving the shaft. The cuffs 7 may be attached to the shaft by any suitable means. In the present instance there is shown a screw 8. This screw is shown with only one cuff but it may be used with both cuffs.

On one end of the shaft is a pulley 9. The other end of the shaft may have attached thereto any suitable and convenient operating or operated means. The shaft is supported within the housing by means of an arm 10, which extends through an opening in one of the sections and may be fastened thereto by one of the bolts 4 or by any other suitable means. The arm within the housing has two prongs 11, which are looped at the ends to form cavities or seats for the bearing springs 12. In the present instance there are shown two of these springs, one supported by each prong of the arm. These springs are formed of hard steel and are coiled in uniform condition and supported within the loop formed on the prongs 11.

Between the prongs and the springs are curved plates 13 of soft metal. These plates extend about two-thirds around the springs and are held close to the springs by means of screws 14. These plates are soft in order to closely fit over the outer periphery of the spring and firmly hold it in position without causing the spring to be distorted or misformed. The plate being formed of soft metal, also allows or permits a reasonable amount of movement in the spring without destroying the shape of the spring and prevent its serving as a proper bearing for the shaft.

Between each spring and the end of the housing is an annular plate or washer 15. This plate may be made of any suitable material, such as some metal, and is either attached to the springs or the housing. They serve as a support for one end of each spring and also as a check or stop for the lubricant that has passed through the bearings. The housing or casing constitutes a lubricant chamber. The lubricant is shown in Figure 3 in the bottom of the casing. For the purpose of conveying the lubricant from the head of lubricant there is located around the shaft a ring 16, which dips into the lubricant. As the shaft rotates this ring gradually rotates and carries lubricant from the head of lubricant to the shaft. The lubricant is indicated by the numeral 17. The lubricant thus conveyed to the shaft contacts with the ends of the springs and is conveyed along the shaft, between the shaft and the springs by means of capillary attraction. The spaces or grooves formed by the coils of wire constituting the spring are so small that the oil or lubricant is conveyed by means of capillary attraction, as well as by the rotation of the shaft within the bearings.

The parts of this apparatus are few, easily replaced when worn or broken by new parts, and effective when used for the purposes here defined.

The relative relation of the spring 12 and the shaft is shown in Figure 3 in an exaggerated form. This figure shows in an exaggerated manner the space between the spring and the shaft, and shows the oil around the coils of the spring and between the spring and the shaft. The position of the ring 16 is such that it conveys lubricant to either of the springs with equal ease and facility, and after the lubricant has thus been conveyed to the spring it is conveyed to all parts of the bearings so that the shaft rotates within the bearings with the greatest facility and ease, and with the least possible wear.

I desire to comprehend within my invention such modifications as may be clearly embraced within my claims and the scope of my invention.

It will be understood that the bearing spring may be made of other materials than steel, such as brass, phosphor bronze or other alloyed metals.

Having thus fully described my invention, what I claim as new and desire to secure by Letters Patent, is:

1. In a lubricating apparatus, a housing adapted to contain a lubricant, an arm in the housing having a loop at one end, a coil spring in said loop, a soft metal plate between the spring and the arm, means acting on the plate to grip the spring, a shaft in the spring, and means in the housing to convey lubricant to the shaft adjacent the spring.

2. In a lubricating apparatus, a housing adapted to contain a lubricant, an arm in the housing having a loop at one end, a coil spring in said loop, a soft metal plate between the spring and the arm, screw means engaging the arm and plate to cause the plate to grip the spring, a shaft in the spring, and a ring loosely mounted on the shaft to convey lubricant to the shaft adjacent the spring.

3. In a lubricating apparatus, a housing adapted to contain a lubricant, an arm in the housing having a loop therein, a coil spring in said loop, cushion means to hold the spring in the loop, a shaft in the spring, and a ring loosely mounted on the shaft to convey lubricant to the shaft adjacent the spring.

4. In a lubricating apparatus, a housing adapted to contain a lubricant, a pair of arms in the housing, each having a loop therein, a coil spring in each loop, means in each loop to grip the spring comprising a soft metal plate, a shaft in the spring, and a ring loosely mounted on the shaft between the springs to convey lubricant to the shaft and to the springs.

In testimony whereof, I affix my signature.
RALPH H. THATCHER.